United States Patent [19]
Demmel et al.

[11] Patent Number: 6,103,949
[45] Date of Patent: Aug. 15, 2000

[54] ALKALINE PHOSPHATE-ACTIVATED CLAY/ZEOLITE CATALYSTS

[75] Inventors: Edward J. Demmel, Newport Beach, Calif.; Albert A. Vierheilig, Richmond Hill, Ga.

[73] Assignee: Bulldog Technologies U.S.A., Inc., Wilmington, Del.

[21] Appl. No.: 09/407,035

[22] Filed: Sep. 27, 1999

Related U.S. Application Data

[62] Division of application No. 08/843,246, Apr. 14, 1997, Pat. No. 5,958,818.

[51] Int. Cl.⁷ .................................................. C07C 2/58
[52] U.S. Cl. .................... 585/722; 585/709; 208/120.01; 502/63; 502/64; 502/67; 502/68; 502/80
[58] Field of Search ................................. 502/63, 64, 68, 502/80, 67; 208/120.01; 585/709, 722

[56] References Cited

U.S. PATENT DOCUMENTS

| | | | |
|---|---|---|---|
| 5,190,902 | 3/1993 | Demmel | 502/63 |
| 5,288,739 | 2/1994 | Demmel | 502/63 |
| 5,456,821 | 10/1995 | Absil et al. | 208/114 |
| 5,472,922 | 12/1995 | Degnan et al. | 502/60 |
| 5,958,818 | 9/1999 | Demmel et al. | 502/68 |

*Primary Examiner*—Tom Dunn
*Attorney, Agent, or Firm*—Dorr, Carson, Sloan & Birney, P.C.

[57] ABSTRACT

Zeolite/clay/phosphate catalysts can be prepared by a process wherein a composition of zeolite-clay-phosphate is brought to a pH level of about 7.0 to about 14.0. The resulting slurry is then age reacted for about 0.5 to about 24 hours. Thereafter the slurry is dried to produce a zeolite/clay/phosphate catalyst particles that are particularly characterized by their high levels of zeolite stability.

18 Claims, 1 Drawing Sheet

ALKALINE PHOSPHATE-ACTIVATED CLAY/ZEOLITE CATALYSTS

RELATED APPLICATIONS

This patent application is a divisional application of U.S. patent application Ser. No. 08/843,246 filed Apr. 14, 1997 now U.S. Pat. No. 5,958,818.

BACKGROUND OF THE INVENTION

1. Field of the Invention.

This invention is generally concerned with stabilizing the catalytic activity of those zeolite catalysts employed in (1) fluid catalytic cracking, reforming, etc. processes used in the petroleum industry (as well as in various chemical manufacturing processes that do not involve petroleum products), (2) fixed bed catalytic processes (involving petroleum products or non-petroleum products), (3) fluid bed catalytic processes (involving petroleum products or non-petroleum products) or (4) so-called deep catalytic cracking ("DCC") (involving petroleum or non-petroleum products). Such zeolite "stabilization" implies a reduction in the rate at which a given zeolite's catalytic activity is lost due to such factors as thermally induced damage to that zeolite's molecular structure, as well as accumulation of coke, sulfur and/or undesired metals on its catalytically active sites. More particularly, this invention is concerned with stabilizing zeolites against these harmful effects by chemically reacting them with clay materials (rather than merely physically mixing them with such materials) through the use of certain alkaline, phosphate-containing compounds, certain pH conditions and certain reaction time parameters.

2. Nature of Zeolites.

As used in this patent disclosure, the term "zeolite" should be taken to include any crystalline silicate having a zeolite crystalline structure. Detailed descriptions of such crystalline structures may be found in D. W. Breck, Zeolite Molecular Sieves, John Wiley and Sons, New York, 1974, see also: Society of Chemical Engineering (London), Monograph Molecular Sieves, p. 186 (1968) by C. V. McDaniel and P. K. Maher; both of these reference works are incorporated herein by reference. Hydrothermally and/or chemically modified versions of various zeolites, such as the so-called "ultrastable" zeolites (e.g., those described, in U.S. Pat. No. 3,293,192 and U.S. Pat. No. 3,506,400), also should be regarded as being zeolites for the purposes of this patent disclosure.

Most zeolites have particles sizes ranging from about 2 to about 10 microns and, hence, are too small for direct use as catalysts such as (FCC) particles (which are usually sized at about 60–80 microns). Consequently, almost all zeolitic crystalline alumino silicates that are used as catalysts are physically "embedded" in a matrix or binder material in order to make composite zeolite/binder particles having more appropriate sizes. Typically, the major component(s) of those matrix or binder materials used to make zeolite-containing catalysts are: silica, alumina, magnesia, zirconia, boria, aluminum chlorohydrol and various non-ionic clays. Alumina, silica and silica alumina are the more preferred materials since they generally serve to impart toughness and attrition-resistant qualities to zeolite/binder catalyst materials.

Kaolin, montmorillinite and bentonite are the most widely used non-ionic clay binder materials (see for example U.S. Pat. Nos. 3,252,757, 3,252,889 and 3,743,594). They are used primarily because they are far less expensive than the alumina, silica, etc. compounds they may replace in zeolite/binder systems. Such non-ionic clays must, however, be used sparingly. That is to say that most high non-ionic clay content catalyst particles (e.g., those containing more than about 20 weight percent clay) usually lack the quality of "toughness" or "attrition-resistance." This lack of toughness or attrition resistance eventually leads to the creation of smaller catalyst particles. This, in turn, leads to unacceptable elutriation losses of these very expensive materials.

Various methods of physically incorporating zeolite particles into clay-containing binder materials are described in the patent literature. For example, U.S. Pat. Nos. 3,609,103; 3,676,330; 3,835,031; 4,240,899; 4,740,292; 4,898,846; 4,911,823; 5,102,530; 5,219,536 and 5,270,272 teach various methods of incorporating zeolite(s) particles into clay-containing binder systems. The zeolite particle components of the resulting zeolite/clay catalysts are usually discrete units—i.e., the zeolite particles are physically embedded in an otherwise continuous phase of the binder material. The prior art also has recognized that certain different zeolites can be used in combination to produce synergistic effects. For example, International Application Number PCT/US94/07865 teaches use of catalysts comprised of zeolite beta and a shape selective cracking catalyst such as ZSM-5 (as well as other catalyst such as zeolite Y). These zeolite blends can be used in the form of composite particles or as separate and distinct ZSM-5 particles and zeolite beta particles —all of which are made through use of some appropriate matrix-forming material. With respect to such matrix materials this PCT patent application states that:

It may be desirable to incorporate the zeolites (any of them, ranging from the conventional zeolite Y to zeolite beta or ZSM-5) into a conventional matrix.

Such matrix materials include synthetic and naturally occurring substances, such as inorganic materials, e.g., clay, silica, and metal oxides such as alumina, silica-alumina, silica-magnesia, etc. The matrix may be in the form of a cogel or sol . . . The matrix material may include phosphorus that is derived from a water soluble phosphorus compound including phosphoric acid, ammonium dihydrogen phosphate, diammonium hydrogen phosphate, ammonium phosphate, ammonium hypophosphate, ammonium phosphite, ammonium hypophosphite and ammonium dihydrogen orthophosphite.

3. Description of Prior Art Re: Use of Phosphate Treated Clays.

Phosphate treated clays have been used in various zeolite/binder catalyst systems. By way of example, U.S. Pat. Nos. 5,190,902 ("the '902 patent") and 5,288,739 ("the '739 patent") teach that attrition-resistant binder materials for a variety of catalysts (including zeolites) can be prepared by a process wherein a slurry of clay particles is brought to either a low pH level (e.g., 1.0 to 3.0) or to a high pH level (e.g., 14.0 to 10.0) and mixed with a phosphate-containing compound. The resulting slurry is then spray dried and the particulate products calcined to produce attrition-resistant particles. For reasons that will be made more apparent in later portions of this patent disclosure, these two patents are particularly relevant to the teachings of the present patent disclosure and, hence, they are each incorporated herein by reference.

U.S. Pat. No. 5,521,133 teaches production of catalysts by a process wherein phosphoric acid is injected in a neutral to mildly alkaline kaolin slurry immediately prior to spray drying. This is done in order to improve the attrition resistance properties of the resulting catalysts. U.S. Pat. Nos. 5,231,064 and 5,348,643 teach processes for converting feedstock hydrocarbon compounds through use of zeolite/ clay catalysts whose ingredients have been treated with a phosphorus-containing compound, for example, ammonium dihydrogen phosphate or phosphoric acid, and wherein the zeolite/clay slurry used to make these catalysts is spray dried at a low pH, e.g., preferably at a pH lower than 3. This process also is characterized by its relatively short aging times (e.g., less than 30 minutes). U.S. Pat. No. 3,932,268 teaches a catalyst composition comprising an ion-exchanged synthetic crystalline faujasite and an amorphous alumina-silica residue of a caustic leached calcined kaolin clay which has undergone a kaolin exotherm reaction during a preceding calcination procedure. U.S. Pat. No. 4,235,753 discloses crystalline zeolitic aluminosilicate catalysts made from calcined kaolin clay that has been treated with an aqueous alkaline liquid. U.S. Pat. No. 5,312,792 teaches a method for preparing a phosphorous-containing ultrastable Y-zeolite which comprises (a) ion-exchanging and washing sodium Y zeolite with an ammonium salt solution and water to obtain a Y-zeolite, (b) combining the washed Y-zeolite with an aqueous solution of a phosphorus compound selected from the group consisting of $H_3PO_4$, $NH_4 H_2PO_4$, $(NH_4)_2HPO_4$, and $Na H_2PO_4$ to obtain a Y-zeolite that contains about 0.1 to 5 weight percent $P_2O_5$, (c) heating the phosphorus-containing Y-zeolite of step (b) in the presence of steam to obtain a phosphorus-containing ultrastable Y-zeolite and (d) washing the phosphorus-containing ultrastable Y-zeolite to remove sodium ions.

Prior Art Limitations On Zeolite Catalyst Selection

Those skilled in this art will appreciate that even though there are over 100 known zeolite molecular sieve structures with over 200 different structural compositions, only a handful of these materials are in fact used extensively as catalysts. For example, in catalytic cracking, hydrocracking, and light paraffin isomerization processes, the same two zeolites, (zeolite Y and mordenite), have been mainstay catalysts for over thirty years. Similarly, olefin skeletal isomerization, dewaxing and dehydrocyclization production processes commonly utilize zeolites (e.g., ZSM-5 and beta zeolite) that were discovered over twenty years ago. The predominance and longevity of these zeolites is at least in part explained by the fact that they provide a range of molecular sieve pore sizes.

Those skilled in this art also will appreciate that the most vexing problem associated with even the best zeolite catalysts is their general inability to maintain their stability in the face of the detrimental effects caused by thermal damage to, and/or sulfur, coke and metal contamination of, their acid sites. High temperature damage to zeolites is generally believed to be through dehydroxylation and/or dealuminization of their acidic sites. And this seems to be particularly true in the case of those zeolites having low silica:alumina ratios. In any case, such damage usually manifests itself by some decrease in performance such a decrease in the ability of a given zeolite to convert larger hydrocarbon molecules to smaller ones.

Such thermal damage can be traced to the high temperatures associated with many of the chemical reactions carried out by such catalyst, and/or to the various treatments used to regenerate them. For example, petroleum cracking operations are usually carried out at temperatures ranging from about 900° F. to about 1450° F.; and employ high temperature-bearing steam to strip occluded hydrocarbons compounds from such zeolite catalysts in order to regenerate them. Unfortunately, the deleterious effects of both high temperature chemical reactions and steam stripping operations are cumulative and, in conjunction with the particle impacts they encounter in use, ultimately destabilize and then destroy the catalyst material.

Some zeolitic catalysts (e.g., ZSM-5) also are known to be particularly susceptible to deactivation due to their particularly strong tendencies to pick up sulfur. This probably follows from the fact that, instead of eliminating the chemically combined sulfur as a sulfur oxide, high temperature contact of these particular zeolites with oxygen-containing gases causes conversion of certain sulfur-containing materials to sulfate anions which tend to be retained within their crystal lattice structure. These sulfate anions are probably retained simply because they are relatively large molecules. In any case, their retention tends to cause substantial reductions in the pore volume of these zeolites. This, in turn, causes a concomitant reduction in the surface area accessible to those hydrocarbon molecules that are to be cracked. Sulfate contamination of this kind often manifests itself in loss of certain particularly desired catalytic activities, e.g., loss of a ZSM-5 catalyst's ability to produce liquid petroleum gas ("LPG") molecules.

Thus, it is fair to say that any process that is capable of better stabilizing the catalytic activity of any given zeolite would be a welcome addition to the chemical arts. If such a process is capable of imparting stability to a wide variety of zeolites, so much the better. And if such a process can employ less expensive, but heretofore unusable, zeolites, this is even better yet.

SUMMARY OF THE INVENTION

This invention is generally concerned with stabilizing zeolite-containing catalysts with respect to their ability to catalyze a wide variety of chemical and/or petrochemical reactions. It is, however, especially concerned with stabilizing those zeolite-containing catalysts that are used in hydrocarbon cracking and reforming reactions employed in petroleum refining operations. Applicants achieve this stabilization by chemically reacting such zeolite catalysts with clay binder materials to a degree heretofore not achieved and/or appreciated. Such reactions employ certain alkaline phosphates ingredients, and certain unusually long reaction time periods, in order to produce zeolite/clay/phosphate catalysts wherein the zeolite and the clay ingredients are chemically reacted with each other—as opposed to those prior art processes wherein zeolite particles are merely physically mixed with a clay matrix-forming material, or as opposed to those prior art processes wherein zeolites, clays and phosphates are chemically reacted (e.g., those described in the '902 patent and in the '739 patent), but which are not chemically reacted nearly to the extent achieved by the processes of this patent disclosure.

The far greater extent of the chemical reactions between a wide variety of zeolite and clay ingredients using the processes of this patent disclosure are evidenced by very dramatic increases (e.g., at least as much as a 10% increase, and sometimes even on the order of two to four fold increases), in certain hydrocarbon catalyzing abilities of the hereindescribed alkaline phosphate-activated clay/zeolite catalysts relative to those produced by prior art methods—and especially those taught in co-applicant Demmel's '902 and '739 patents. These hydrocarbon catalyzing abilities may include increased: LPG conversion vol., C5 +gasoline vol., C3 vol., total alkylate vol., Research Octane Numer (RON), raw gasoline RON etc. Thus, a given catalysts of this patent disclosure may be further characterized by its ability to produce at least a 10% increase in a given catalytic activity relative to an analogous catalyst made with the same zeolite-clay-phosphate ingredients, but whose clay-phosphate ingredients are not age-reacted for 0.5 to 24 hours and whose zeolite ingredient is not age-reacted for at least 0.25 hours.

Such increases show that compositions produced by the processes of this patent disclosure should be regarded as being different compositions of matter from those described in the '902 and '739 patents, notwithstanding the fact that their starting ingredients are, in some instances, the same. Consequently, a large part of this patent disclosure will be devoted to describing the comparative advantages produced by use of those special parameters (especially reaction times) that must be placed upon the chemical reaction systems of this patent disclosure.

Applicants' processes have two general embodiments. Stated in broad terms, the first embodiment comprises: (1) preparing a zeolite-clay-phosphate composition such as a slurry or a paste or other plastic mass such as a dry pressible composition having a pH of from about 7.0 to about 14.0; (2) using the zeolite, clay and phosphate ingredients in quantities such that a dry end product ultimately made from the zeolite-clay-phosphate composition will be comprised of from about 0.5 to about 40 weight percent zeolite, from about 50 to about 94.5 weight percent clay and from about 5 to about 25 weight percent phosphate; (3) age-reacting the resulting zeolite-clay-phosphate composition for about 0.5 to about 24 hours (at temperatures ranging from 15° C. to 95° C.); drying said zeolite-clay-phosphate composition to produce a solid, alkaline phosphate-activated clay/zeolite composition.

This composition also may be regarded as a "compound" because applicants' experimental data indicates that a chemical reaction has occurred between the ingredients (as opposed to a mere "mixing" of those ingredients). In some preferred embodiments of this invention, such age-reacted materials may be dried by various drying, pressing and/or calcination processes. For example, a slurry of the age-reacted material may be spray dried into microspheroidal particles which are then calcined by calcination procedures that are well known to the catalyst manufacturing arts. In any case, use of these ingredients, proportions, pH conditions and reaction times will produce zeolite/clay/phosphate products whose zeolite and clay ingredients are chemically reacted (rather than merely being solid state mixtures) and which display dramatically higher levels of zeolite stability with respect to catalyzing a wide variety of chemical reactions.

The first embodiment of this invention can be modified to produce a second embodiment wherein a zeolite ingredient is introduced into a clay-phosphate composition after said composition has been age-reacted for about 0.5 to about 24 hours at comparable pH and temperatures conditions. After the zeolite is added to the age-reacted clay-phosphate composition, the resulting zeolite-clay-phosphate composition is then further age-reacted for about 0.25 to about 24 hours. Preferably this second age-reaction step also takes place at pH and temperature conditions comparable to those used in the first age-reaction step. The fact that this second embodiment produces catalysts having activities comparable to those produced by the first embodiment suggests that the age-reaction of the clay-phosphate is a most important part of the overall reaction scheme of both embodiments of this invention. In other words, applicants' experimental work indicates that the clay-phosphate should be allowed to age for about 0.5 to about 24 hours in order to be made ready to fully react with the zeolite—and that this is true whether or not the zeolite is present while the clay-phosphate is aging —or is subsequently added to an already age-reacted clay-phosphate composition.

Most preferably, the alkaline conditions (7.0 to 14.0 pH and preferably 8.0 to 9.0 pH) that should be employed in the age-reaction processes of either of these two embodiments should be present over a major portion, or substantially all of, a first 0.5 to 4 hours of the broader 1–24 age-reaction period. For example, applicants have found that if a clay-phosphate composition such as a slurry (either having, or not having, a zeolite incorporated therein) is not within this prescribed pH range over most of the first 0.5 to 4 hours of a longer overall aging period, the desired zeolite stabilization qualities in any resulting zeolite/clay/phosphate particles are somewhat diminished.

Applicants believe that the underlying requirement for the above-noted alkaline pH conditions in a clay-phosphate reaction composition follow from the fact that the crystalline lattice structures of the clay particles used in these processes contain aluminum components that are ionically bonded to oxygen. Applicants' experimental work indicated that the above-described alkaline pH conditions serve to alter this bonding arrangement to one in which the aluminum components of a clay are in a plus three valance state (i.e., wherein the resulting $Al^{+++}$ is no longer bonded with oxygen as it is in the clay's untreated state). It appears that achievement of this valance state renders at least some of the aluminum components of a clay capable of forming chemical complexes with at least some of the alumina components of a zeolite—and that this condition helps bring about creation of those complex units that are ultimately responsible for carrying out the herein described chemical reactions between the zeolite and the clay. In other words, applicants' experimental work indicates that the alkaline conditions taught in this patent disclosure suggest change of the aluminum-oxygen bonds found in most clays (natural or synthetic) to a cationic form, i.e., $Al^{+++}$ which is then capable of producing clay/phosphate complex units that are particularly well suited to chemically react with a zeolite in a manner that greatly stabilizes the resulting zeolite/clay/phosphate catalyst material. However, applicants' experimental work also clearly shows that it takes from about 0.5 to about 4 hours and as much as from 0.5 to about 24 hours for these clay/phosphate complex units to become fully activated—that is to say that the clay-phosphate ingredients of this patent disclosure need about 0.5 to about 24 hours (at ambient conditions) to form those complex units having the unusually high chemical reactivities that enable them to so strongly react with any zeolite materials they encounter. Applicants repeatedly found that if the clay-phosphate slurries are not allowed to age-react for at least 0.5 hour at ambient conditions, the chemical reactions between the zeolite and the clay contemplated by this patent disclosure either do not take place or only take place to a degree such that the resulting catalysts have very decidedly lower zeolite stability qualities. Applicants also have found that reaction times of from about 0.5 to about 4 hours are usually preferred from an efficiency point of view since a major part of (e.g., 50 to 90% of) the activity gain of these catalyst can be achieved within about 4 hours. Along these same lines, applicants also have found that raising the temperatures at which these aging-reactions are carried out speeds up these processes to some degree, but even at temperatures ranging from 70° C. to 95° C., age-reaction times of from about 0.25 to 4 hours are needed to produce the high zeolite stability catalysts contemplated in this patent disclosure.

CATALYST INGREDIENTS

Zeolites

Zeolites are widely used throughout the chemical industry, and especially in petroleum refining. Both naturally occurring zeolites and a wide variety of synthetic zeolites have been used for such purposes. The present invention may use either of these general categories of zeolite, but the synthetic forms are generally somewhat more preferred. Synthetic zeolites are often prepared by using organic templates that alter the crystal habit of a zeolite crystallite in order to impart various desirable catalytic properties to the resulting material. Perhaps the best known example of a synthetic zeolite used in petroleum refining is ZSM-5. There are, however, well over a hundred other synthetic zeolites. Those crystalline zeolitic materials designated as "mordenites" and as "beta zeolites" also are of some commercial importance. It also should be noted that mordenites and beta zeolites happen to be particularly well suited to producing applicants' alkaline phosphate-activated clay/zeolite catalysts. Those skilled in this art also will appreciate that, within any given type of crystalline zeolite, there may well be further distinctions based upon variations in silica-to-alumina ratios or other parameters that influence the catalytic activities of a given zeolite.

Synthetic Faujasites

Synthetic faujasites are a particularly preferred type of zeolite for use in applicants' alkaline phosphate-activated clay/zeolite catalysts. Synthetic faujasites generally have silica to alumina ratios ranging from about 3.0 to about 100. Usually, those having lower silica/alumina ratios (e.g., from about 3.0 to about 6.0) are made by direct crystallization. Those with higher silica to alumina ratios are normally made by removing alumina from an existing crystal lattice. This removal can be accomplished by steaming such zeolites at elevated temperatures, or by acid leaching, or by chelation, or by various combinations of these procedures. In still other processes for the production of synthetic faujasite catalysts, alumina is removed from a zeolite's lattices and silica is inserted in its place.

Be these manufacturing procedures as they may, for the purposes of this patent disclosure, the term "zeolite" should be taken to include any crystalline silicate having a zeolite crystalline structure; they certainly should include (1) large pore zeolites (e.g., those having pore openings greater than about 7 Angstroms) such as, for example, USY, REY, silicoaluminophosphates SAPO-5, SAPO-37, SAPO-40, MCM-9, metalloaluminophosphate MAPO-36, aluminophosphate VPI-5, or mesoporous crystalline material MCM-41; REUSY, zeolite Z. zeolite Y, dealuminated zeolite Y, silica-enriched dealuminated zeolite Y, zeolite Beta, ZSM-3, ZSM-4, ZSM-18 and ZSM-20, (2) medium pore zeolites (e.g., those having pore openings of from about 4 Angstroms to about 7 Angstroms) such as, for example, ZSM-5, ZSM-11, ZSM-5ZSM-11 intermediates, ZSM-12, ZSM-22, ZSM-23, ZSM-35, ZSM-38, ZSM-48, ZSM-57 silicoaluminophosphate SAPO-31 and (3) small pore zeolites (e.g., those having pore openings of less than about 4 Angstroms) such as, for example, erionite and ZSM-34.

Still other materials having zeolite crystalline structures that may be used to great advantage in the practice of this invention would include zeolite A, zeolite B, zeolite F. zeolite H, zeolite K-G, zeolite L, zeolite M, zeolite Q, zeolite R, zeolite T, mordenite, erionite, offretite, ferrierite, chabazite, clinoptilolite, gmelinite, phillipsite and faujasite. Hydrothermally and/or chemically modified versions of many of these zeolites, such as the so-called "ultrastable" zeolites, also may be employed to great advantage in the practice of this invention. Moreover, many of the zeolites used to make the overall catalysts of this patent disclosure may be employed as mixtures or combinations of such large pore, intermediate pore, and/or small pore zeolite materials. A typical example of such a mixture or combination might include (but by no means be limited to) a medium pore zeolite such as ZSM-5 (e.g., one having a $SiO_2/Al_2O_3$ mole ratio of greater than about 20/1) and a large pore, zeolite such as USY, REY and/or REUSY.

Alkaline Phosphate-Containing Compounds

A variety of alkaline phosphate-containing compounds may be used in the processes of this patent disclosure. Ammonium phosphate compounds are however particularly preferred; and such compounds are most preferably selected from the group consisting of otherwise unsubstituted monobasic phosphate compounds, dibasic phosphate compounds and tribasic phosphate compounds. It also should be noted that, because of its ready availability and relatively lower cost, dibasic ammonium phosphate is a particularly preferred member of this group of compounds. This all goes to say that applicants have found that other alkaline phosphate compounds may be employed in the practice of this invention, but for the most part they are, to varying degrees, less preferred from either a technical or a cost point of view. Mixtures of such alkaline phosphate compounds also may produce especially good results. For example, applicants have found that mixtures of dibasic ammonium phosphate and monobasic ammonium phosphate are particularly well suited to creating certain preferred pH conditions at the lower (e.g., 7.0 to 10.5 pH) end of the overall 7.0 to 14.0 pH range used in the processes of this patent disclosure, and that use of these preferred pH values produces especially effective alkaline phosphate-activated clay/zeolite catalysts when the zeolite component is, for example, ZSM-5 or when the clay component is, for example, kaolin.

Clays

The clay ingredients that can be employed in applicants' process may vary considerably. For example, they can be naturally occurring clays or they can be a wide variety of synthetic clays. For example, various kaolinite clays (e.g., kaolin, halloysite, rectorate, etc.), montmorillinite clays (e.g., natural montmorillinite as well as synthetic montmorillinite clays), sepiolite clays and attapulgite clays can be employed in the processes of this patent disclosure. Of these, naturally occurring kaolinite clays (and most particularly kaolin clay), are the most preferred—if for no other reason other than their relatively lower cost.

RELATIVE PROPORTIONS OF INGREDIENTS

Having identified the chemical nature of the ingredients that can be used in applicants' processes, a few words on their relative proportions are now in order. Generally speaking, the zeolite/clay/phosphate catalysts of this patent disclosure may be comprised of from about 0.5 to about 40 weight percent zeolite, from about 50 to about 94.5 weight percent clay and from about 5 to about 25 weight percent phosphate. It should be specifically noted that these catalysts may have—and preferably do have—clay proportions far greater than the 20 or so weight percent limitation extant in most prior art catalysts wherein zeolite and clay are merely physically mixed with each other. Indeed, in many cases the clay component of these zeolite/clay/phosphate compounds may constitute up to about 94.5 weight percent of theses compounds. These unusually high clay concentrations have great economic implications when one considers that clays are generally considerably less expensive than most other widely used zeolite catalyst binder materials such as silica, alumina, magnesia, zirconia, boria and alumina chlorohydrol.

It also should be noted that the relative proportions of these ingredients will be expressed in this patent disclosure in terms of their weight percentage contributions to the dry, solid ingredients ultimately contained in applicants' final product zeolite/clay/phosphate catalyst particles. That is to say that, unless otherwise noted, the relative proportions of the end product catalysts will be by dry weight; and, hence, will not include the weight of such ingredients as: (i) the liquid medium (e.g., water, alcohol, etc.) used to make up the precursor compositions (slurries, pastes, etc.) in which the zeolite-clay-phosphate materials are originally reacted, or (ii) the non-phosphate components of any alkaline phosphate compounds employed in these processes or (iii) any other volatile materials that are used in the reaction slurry (e.g., viscosity agents), but which are driven off during a drying step that forms a part of the overall manufacturing processes used to make these catalysts. This drying also may be augmented by, or carried out by, various calcination steps that may be employed with respect to these materials.

The relative proportions of the "dry" ingredients (e.g., zeolite clay, hardening agents, etc.) used to make the precursor compositions in which the clay-phosphate and zeolite-clay-phosphate ingredients are chemically reacted also may be varied depending on the physical form of the end product to be made. For example, if the end product is to be a microspheroidal particle suitable for use in a FCC unit, then the most suitable precursor composition will be a slurry suitable for spray drying. If the end product is to be in the form of a pellet or lump suitable for use in a moving bed or fixed bed or fluid bed catalytic operation, then the precursor composition preferably will be in the form of a paste or dry mixture suitable for extruding operations carried out by procedures known to those skilled in the catalyst production arts. Dry mixtures are particularly well suited to use in so-called "dry pressing" processes.

Any other ingredients in applicants' catalysts, if indeed any are employed, will generally comprise only relatively small proportions (e.g., from about 1 to about 20 (and preferably from 1 to 10) weight percent of the overall resulting catalyst). For example various hardening agents such as aluminum silicate, magnesium aluminate, magnesium silicate, magnesium calcium silicate and phosphate may be employed in the hereindescribed alkaline phosphate-activated clay/zeolite catalysts. In discussing these relative proportions with respect to such other possible ingredients, it should be understood that all such other ingredients (e.g., hardening agents) are preferably included in place of a portion of the clay-phosphate ingredient(s) rather than in place of a portion of the zeolite component(s) or the phosphate component(s).

REPRESENTATIVE APPLICATIONS

The catalysts of this patent disclosure can be used in a wide variety of chemical reactions; they are however especially useful in catalyzing various hydrocarbon molecule-altering reactions. These reactions would certainly include those wherein relatively larger hydrocarbon molecules (e.g., having molecular weights greater than 400) are broken down into relatively smaller molecules, as well as those reactions wherein relatively smaller hydrocarbon molecules (e.g., $C_1$ to $C_5$) are subjected to molecular combination reactions that produce larger molecules.

By way of a few specific examples of the processes that may employ the zeolite catalysts of this patent disclosure, a gas oil feedstock (e.g., light, medium, or heavy gas oil) having an initial boiling point above about 204° C., a 50% point of at least about 260° C., and an end point of at least about 315° C. may be cracked by a ZSM-5/kaolin clay/phosphate catalyst made according to the teachings of this invention. Other feedstocks that may be cracked with catalysts made according to the teachings of this patent disclosure would include deep cut gas oils, vacuum gas oils, thermal oils, residual oils, cycle stock, whole top crude, tar sand oil, shale oil, synthetic fuel, heavy hydrocarbon fractions derived from destructive hydrogenation of coal, tar, pitches, asphalts and hydrotreated feedstock materials. As far as combining smaller molecules are concerned, applicants' alkaline phosphate activated clay/zeolite catalysts can be used to catalyze various alkylation process used to make larger branched hydrocarbons from smaller hydrocarbon molecules. For example, highly branched paraffinic gasoline blending stocks can be produced by alkylation of $C_3$ and $C_4$ olefins with isobutane through use of applicants' catalysts.

Thus, some of the most preferred embodiments of this invention will generally comprise catalytically contacting a feedstock petroleum-based composition with such a hydrocarbon-altering catalyst wherein the zeolite and clay are chemically reacted with each other by a process comprising (1) preparing a zeolite-clay-phosphate slurry having a pH of from about 7.0 to about 14.0 that is at least in part achieved through the presence an alkaline phosphate in said slurry; (2) age-reacting the zeolite-clay-phosphate slurry for about 0.5 to about 24 hours; (3) drying the slurry to produce a zeolite/clay/phosphate compound having a zeolite component, a clay component and a phosphate component in quantities such that an end product catalyst ultimately made from the zeolite/clay/phosphate slurry will be comprised of from about 0.5 to about 40 weight percent zeolite, from about 50 to about 94.5 weight percent clay and from about 5 to about 25 weight percent phosphate.

Next, it should be noted that one of the main objects of this invention is to obtain catalysts that will have at least 10% more of some given catalytic activity (e.g., LPG production, isomerization, desulfurization, etc.) relative to an analogous catalyst made with the same ingredients, but which is not age-reacted according to the teachings of this patent disclosure. In many cases the increases in catalytic activity produced in these materials by the processes of this patent disclosure will be far greater than 10%. Indeed, in some cases applicants have obtained 2 to 4 fold increases. Other objects and/or advantages to applicants' catalysts will be made more apparent from the following drawings and detailed descriptions regarding the experimental programs used to establish the efficacy of the alkaline phosphate-activated clay/zeolite catalysts of this patent disclosure.

DETAILED DESCRIPTION OF THE INVENTION

Figure 1:
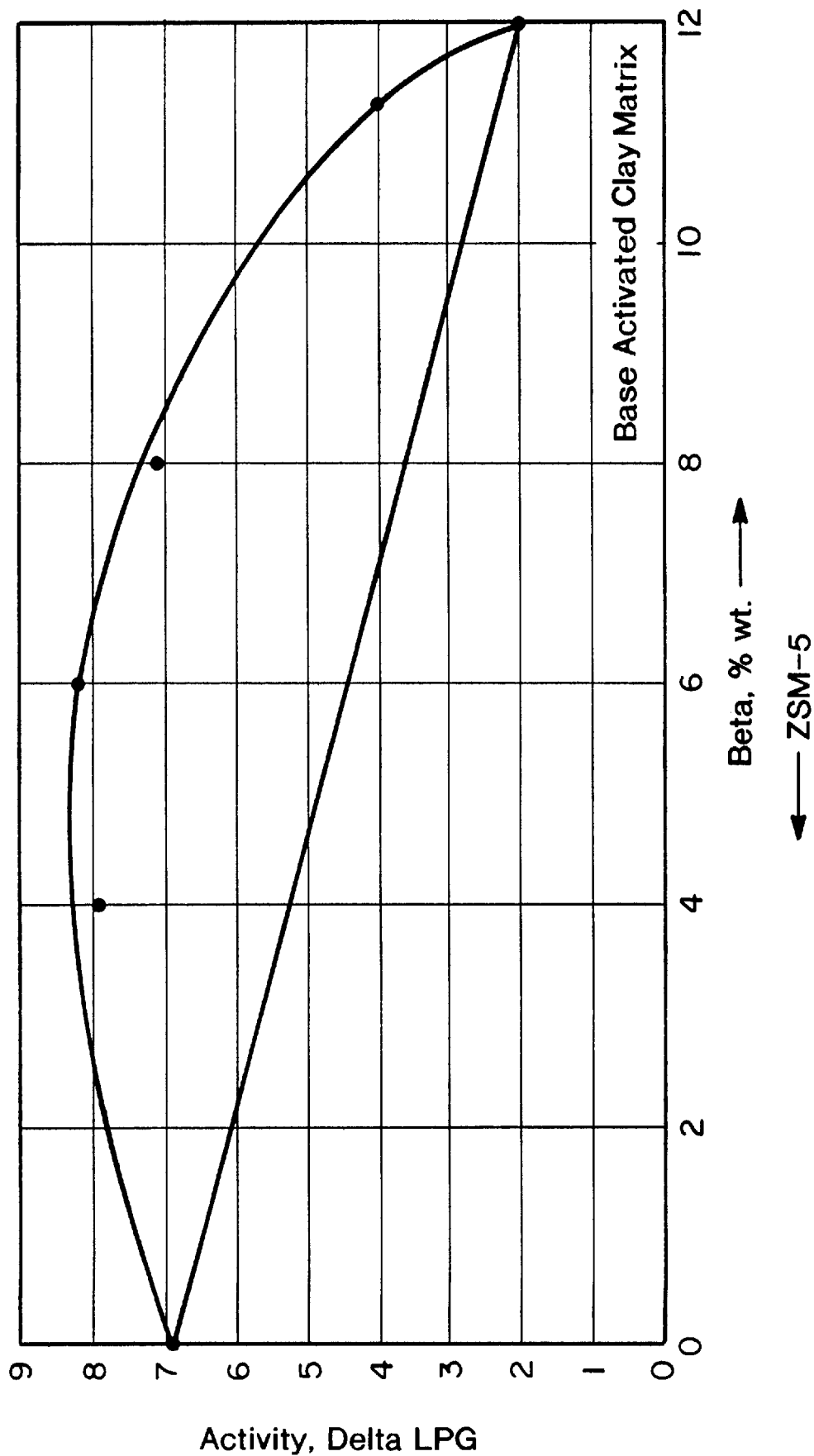
FIG. 1 depicts the catalytic activity (ΔLPG) of various mixtures of ZSM-5 zeolite and beta zeolite in an alkaline phosphate-activate clay matrix made by the processes of this patent disclosure.

The alkaline phosphate-activated clay/zeolite catalysts of this patent disclosure are particularly characterized by the fact that their zeolite and clay ingredients are chemically reacted with each other in a manner that has not heretofore been achieved. This is accomplished by using alkaline reaction conditions (i.e., pH values from 7.0 to 14.0 and more preferably those from 8.0 to 9.0) that are primarily provided by an alkaline phosphate material and long reaction periods (e.g., from about 0.5 to about 24 hours, but preferably from about 0.5 hours to about 4 hours). These long reaction times will from time to time be associated with the terms "age-reacted," "aging-reaction(s)" or "age-reaction(s)" in this patent disclosure. Applicants' catalysts can be made by either of two general procedures. In the first procedure, the zeolite, clay and alkaline phosphate ingredients are mixed and age-reacted together for at least about one-half hour and preferably from about 1 to about 24 hours at ambient conditions. In the second procedure, the clay and alkaline phosphate are mixed and age-reacted together in a first age-reaction period that also lasts from about one-half hour to about twenty-four hours. Thereafter, a zeolite is added to the age-reacted alkaline phosphate-activated clay slurry. The resulting slurry is then further age-reacted for an additional one quarter hour to twenty-four hour aging period. This second aging reaction has a preferred duration of from about one-half to about four hours at ambient conditions.

Initial Insight into Applicants' Discovery

Early in an experimental program involving microactivity testing (MAT) of zeolite/clay/phosphate catalysts, applicants tried to develop a method for preparing catalysts that would not involve spray drying. This was of great practical concern because only a few grams of catalyst sample are needed for microactivity testing, while a minimum of about 1 to 2 kilograms of catalyst are needed for spray drying operations. Therefore, in order to avoid this drawback, applicants tried the technique of slurry-drying some catalyst samples. Applicants prepared a slurry similar to those subjected to spray drying, and then simply placed the sample in an oven at 275° F. to allow the material to slowly dry (usually overnight). This is to be contrasted with the almost instantaneous drying that occurs at the high temperatures employed in spray drying operations. The slowly dried samples were then steamed and run in a microactivity test unit (MAT unit). Much to applicants' surprise, the slurry-dried materials were consistently much more catalytically active relative to otherwise identical materials that were spray-dried soon after they were formulated. Indeed, it was not at all uncommon to find that the catalytic activity of the slurry-dried samples were double, and sometimes even as much as quadruple, that of an analogous spray-dried material. This data suggested that the chemical reaction that takes place between the subject zeolite, clay and phosphate takes far longer than has been appreciated by the prior art.

Applicants' ensuing experimental program verified that age-reacting a zeolite-clay-phosphate system produces dramatic effects on the stability of a wide variety of zeolite/clay/phosphate catalyst resulting from such age-reaction processes. This program also showed that this age-reaction requirement holds true regardless of whether the zeolite is present during the alkaline phosphate activation of the clay, or the zeolite is later added to an age-reacted, alkaline phosphate activated clay and then age-reacted in the presence of that clay. In either case, if a zeolite is exposed to either of the two hereindescribed alkaline phosphate-activated clay systems, the resulting catalyst will have far greater catalytic stability then it has if it is not exposed to the alkaline pH conditions (7.0 to 14.0) and the one-half to twenty-four hour aging conditions of the processes of this patent disclosure. Applicants also repeatedly found that most of the desired effects of these aging reactions are achieved in about one-half to about four hours (at ambient temperature and pressure conditions) for a wide variety of zeolite and clay types.

In order to establish the time parameters of this aging phenomenon, applicants first aged various forms (acid and alkaline) of alkaline phosphate-activated clays at ambient conditions according to the methods described in Example 1 (an acid system) and Example 2 (an alkaline system) of this patent disclosure. Applicants then ran certain representative hydrocarbon cracking tests on the resulting materials. These clay-phosphate materials did not have a zeolite catalyst associated with them. Nonetheless, they were tested as if they were hydrocarbon cracking catalysts (as measured by their hydrocarbon conversion ability) in their own right. The results of one such representative test are summarized in Table I.

TABLE I

| | Conversion, % wt. | |
|---|---|---|
| Aging Time, Hrs. | Alkaline Form | Acid Form |
| Immediately | 10.8 | 15.3 |
| 0.5 | 9.7 | 8.3 |
| 1.0 | 7.5 | 6.9 |
| 2.0 | 8.1 | 7.3 |
| 4.0 | 30.1 | 6.8 |
| 24.0 | 29.6 | 8.0 |

Generally speaking, Table I shows that the catalytic activity of an acid form of a clay-phosphate system has a very high immediate hydrocarbon conversion ability; but that this high activity steadily declines with time. The alkaline form of a comparable clay-phosphate system also shows a similar decline in catalytic activity—for about the first hour. Longer aging times, however, begin to produce some very dramatic jumps in the catalytic conversion ability of the alkaline form of the system—especially in the time period between about one and about four hours after the starting ingredients are mixed together. This general observation also held true for a wide variety of alkaline activated clay materials.

Subsequent tests showed that if a zeolite is included in an otherwise comparable alkaline-activated clay system, most of (e.g., 50 to 90 percent of) the catalytic activity of the resulting material was likewise generally achieved in those systems wherein the reaction slurry was allowed to age from about one to about four hours. For example, a ZSM-5 type zeolite was introduced into an alkaline-phosphate-activated clay in the manner described in Example 3. In this system, the effects of aging-reaction times were studied and age-reaction times of 0.5 to 24 hours (at ambient conditions) produced the best catalyst materials. Applicants also found that age-reaction temperatures of about 70° C. could be used to lower the one-half hour age-reaction time requirement down to about one quarter hour. Applicants also found that age-reaction times beyond about four hours and up to about twenty-four hours generally produced little (or in some cases no) further improvement in the catalytic activity of many of those ZSM-5 clay/phosphate catalyst systems that were studied.

Applicants also established that, in those cases where a zeolite is not present during an initial age-reaction of the alkaline phosphate activation of the clay, but rather is added after this first age-reaction process takes place, the resulting system need not be subjected to a long aging-reaction (e.g., longer than about 15 minutes) second aging-reaction. For example, in one series of experiments, zeolite-clay-diammonium phosphate systems were prepared according to the method generally described in Example 4 wherein a zeolite was added after a first aging-reaction. The subsequently added zeolite was given relatively little opportunity (e.g., less than 15 minutes) to react with the age-reacted clay. The resulting materials generally displayed far less catalytic capability relative to those catalysts in which the zeolite was age-reacted with the clay and diammonium phosphate for a half hour or more. These results strongly suggest that the critical or rate-controlling step is the aging-reaction of the clay/diammonium phosphate mixture. Once this was accomplished, the reaction between the zeolite and clay/diammonium phosphate per mixture was rather fast (e.g., in as little as about 15 minutes).

The next task addressed by applicants' overall experimental program was to determine whether or not the dramatically higher cracking activities of applicants' age-reacted catalysts (relative to those made by other methods such as those taught in the '902 or '739 patents), could in some way be attributed solely to the hydrocarbon conversion activity of the zeolite itself—rather than to the zeolite/clay/phosphate reaction products of the production processes of the present patent disclosure. To this end, applicants made zeolite catalysts using alumina (rather than alkaline phosphate-activated clay as a binder material) for the zeolite catalyst (see for example the procedure described in Example 6). The rationale for this line of experiments was to establish whether the cracking activity of the clay could conceivably be associated with an alumina component of the clay that may have been removed from the clay structure upon exposure to an alkaline-phosphate. If this were the case, then it seemed to applicants that making a catalyst using a pure alumina binder material of approximately the same catalytic activity as a clay (e.g., kaolin clay) should give approximately the same results when a zeolite is added to the system. Applicants' data, however, clearly indicated that catalysts made in this way produced very low levels of catalytic activity. This suggests that the alkaline phosphate-activated clay components of applicants' catalysts have some unique property—not possessed by alumina—that enhances the activity of those zeolites that are reacted with these clays according to applicants' methods.

Applicants then investigated the interaction of various zeolites that were age-reacted with clay-phosphate binder systems in order to form new compositions. In carrying out this program, applicants compared certain background information with certain experimental data according to the general experimental program outlined in Table II below.

TABLE II

1. Background Information
A. Steam Deactivation
B. Rates of Reaction of Additives
C. Investigation of factors that effect reaction rates of zeolite/clay/phosphate catalysts of this patent disclosure
2. Further Experimental Data - Re: Zeolite Activity
A. Zeolite Studies
    (1) Effect of % ZSM-5 in Clay Matrix on Reaction Rates
    (2) Effect of temperature on Reaction Rates
    (3) Effect of aging a ZSM-5 Clay-Phosphate slurry
    (4) Effects of Other Types of Matrix Components
B. Beta Zeolite Studies
C. Studies of Systems Containing both Beta and Pentasil Type zeolites (e.g., ZSM-5)

Applicants' rationale for, and results from, the various experimental procedures noted in Table II were as follows.

BACKGROUND INFORMATION

A. Steam Deactivation

Most catalytic materials lose their activity as they are used over and over again in a catalytic process. Hence, the catalytic and physical properties of a used catalyst are different from those of a fresh form of that same catalyst. Those skilled in this art also will appreciate that fresh catalyst is usually added to continuous catalytic processes on a steady or intermittent basis because some of the catalyst is always being attrited and, hence, elutriated from the overall continuous system. The catalyst in a circulating inventory of catalyst are often referred to as "equilibrium catalyst" and the properties of such catalysts are often referred to as the equilibrium properties of that catalyst.

If all catalytic units (e.g., FCC units) were identical, the problems associated with catalyst addition would not be as vexing as they have proven to be. Because of differences in design, feedstock type and management operating philosophy, each chemical process unit has its own distinctive way of using up the activity a given type of catalyst. The problems associated with this lack of uniformity in catalyst use also is exacerbated by the fact that as catalysts age through use, they tend to become much more selective in their specific catalytic activities. Hence, they tend to make more of some products and less of other products. For example, in petroleum refining operations, catalyst selectivity is often thought of in terms of the ability of a given catalyst to crack heavy oil to certain specific lighter, more useful, products such as gasoline, diesel fuel, light cycle oil and liquid petroleum gas (LPG). Lower catalytic activity also is thought of in the petroleum refining industry in terms of the production of more of some of these products at the expense of production of other such products, e.g., production of smaller quantities of the more desired products such as gasoline, and production larger quantities of relatively less desired products such as gas—and, worse yet, coke. Thus, one of the biggest problems associated with testing new catalyst formulations is being able to predict how they will age in a given chemical process unit.

Most catalyst laboratories address this problem in the same general manner. Samples of equilibrium catalyst are obtained from a given chemical process unit. The catalytic properties of that equilibrium catalyst are then determined. This is usually done by running a cracking test in a MAT unit. The surface properties of the equilibrium catalyst also are determined; this usually entails determining the surface area, the pore volume, density, and perhaps the pore volume distribution of the equilibrium catalyst.

A sample of a fresh form of the catalyst to be tested is then subjected to a series of high temperature steam treatments in order to try to obtain a material having substantially the same catalytic and surface properties possessed by the equilibrium catalyst. If this can be done, it is then possible to set up a deactivation test procedure that gives a reasonably good estimation of what will happen to a fresh sample of the catalyst being tested in the FCC unit from which the equilibrium catalyst was taken. Such testing procedures have their limitations, but they still are regarded as being the most effective way of testing and evaluating new candidate catalysts for further testing and development.

B. Rates of Reaction of Additives

Developing catalyst additives (as opposed to bulk, hydrocarbon cracking catalysts) for use in FCC processes present even more difficult testing and evaluation problems. Such difficulties follow from the fact that a catalyst additive often constitutes less than about 2% of the total catalyst inventory in a typical FCC unit. There are, however, techniques for separating mixtures of bulk catalyst particles from catalyst additive particles. In any event, the most generally accepted method for determining the rate of reaction for a catalyst additive material is to run a hydrocarbon cracking test on a sample of bulk cracking catalyst with which the additive is to be associated in order to first determine the yield pattern for the bulk catalyst. Again, in determining such yields, catalyst researchers analyze for the presence and concentrations of all hydrocarbon molecules from hydrogen up to the pentanes. They are, however, particularly concerned with the bulk catalyst's ability to produce gasoline, LPG, light fuel oil and heavy fuel oil. Low coke yields also are a highly valued attribute of any such catalyst. These determinations are normally made based upon various definitions of these products that conform to certain ASTM (American Society Test Methods) standards. The next step in such test procedures is to add a small quantity of an additive to be tested (usually 4 to 10 weight percent of the bulk catalyst) to the bulk catalyst and then run the same cracking tests that were used on the bulk catalyst. The effect of the additive can then be determined by measuring differences in the relative yields of the product's components before and after the additive is added. For example, it is well known that use of a ZSM-5 additive catalyst in a ZSM-5 additive/bulk catalyst mixture produces increases in the yield of liquid petroleum gas or LPG (generally comprising $C_3$ to $C_4$ hydrocarbons) from a gas oil feedstock.

Thus, the catalytic activity of any given additive may be based upon a change in the yield of a given desired product (e.g., LPG, gasoline, diesel fuel, jet fuel, etc.) that is produced by the additive in question. For example, in the case of additives of the hereindescribed zeolite/clay/phosphate catalysts, applicants determined that the change in LPG yield (delta LPG) produced by their catalyst additives were generally proportional to the amount of such additive that was mixed with a representative bulk catalyst. For example, applicants found that for a zeolite/clay/phosphate catalysts made according to the teachings of this patent disclosure, (and representing from about 1 to about 20 weight percent of an additive/bulk catalyst mixture), if the amount of additive was doubled, then the change in LPG production also generally doubled.

The establishment of such yield/quantity relationships has immense practical value because a researcher can then define a reaction rate constant for a given zeolite catalyst through use of the following equation:

$$K = \text{Delta LPG Yield}/(\text{Gms.Cat.} * (\% \text{Additive}/100) * (\% \text{Zeolite}/100))$$

In this equation, the "Delta LPG Yield" term is the changes in yield of LPG produced by the catalyst sample in question. The "Gms. Cat." term of the above equation is the grams of the host (bulk) catalyst used in a microactivity test, e.g., applicants often employed 4 grams for their tests. The "% Additive/100" term in the above equation is the weight fraction of additive added to the bulk catalyst; and the "% Zeolite/100" term is the fraction of ZSM-5 in the additive when a zeolite was in fact the catalyst so employed. Therefore, taken in its entirety, the divisor in the above equation is the number of grams of catalyst (e.g., ZSM-5) in the reactor. Thus, K is the amount of LPG produced per gram of that catalyst additive. In an ideal test system (where it is assumed that there are no ingredient interactions), the value of K should be constant no matter how the catalyst is introduced into the reactor. That is to say that, theoretically, one could simply mix some pure catalyst (e.g., ZSM-5 crystals) with a host catalyst and get the same result as one would get in a case where the catalyst is incorporated into a clay matrix that is then added to the host catalyst.

A typical determination of such a value for K for one of applicants' catalysts may serve to more clearly illustrate this technique. For example, in one of applicants' tests, eight percent by weight of an additive containing 12% by weight ZSM-5 was mixed with 4 grams of a host catalyst and the Delta LPG yield was determined to be 8.35% by weight of the oil employed in the test. Therefore:

$$K = 8.35/(4.0 * (8/100) * (12/100))$$

$$K = 217.4.$$

The amount of ZSM-5 crystal contained in the eight percent additive is 0.0096 grams, or 9.6 milligrams. If one added an identical amount of pure ZSM-5 crystal to 4 grams of host catalyst, one theoretically should, as noted above, obtain the same change in light hydrocarbon yield (e.g., A LPG) as with the zeolite-containing additive. If the yield is different—and it definitely was different using catalysts made by applicants methods —then one is justified in assuming that a significant chemical interaction has taken place between the zeolite and the clay matrix material with which it is associated. Based upon the results of a wide variety of such tests, applicants concluded that new compositions of matter were indeed formed (i.e., uniquely reacted, alkaline phosphate-activated clay/zeolite compounds); and, as a result, the stability of the zeolite catalyst component of such catalysts have been greatly improved relative to those zeolite/clay systems wherein the same zeolite, clay and phosphate ingredients are only physically mixed with one another—that is to say wherein the zeolite particle is merely physically embedded in a solid phase clay binder.

C. Investigation of Factors that Effect Reaction Rates of Zeolite/Clay/Phosphate Catalysts of this Patent Disclosure In order to better understand the nature of the problems associated with determining the reaction rates of the zeolite/clay/phosphate catalysts of this patent disclosure, applicants studied the three rates that could control catalytic reactions of this kind. They are:

1. The rate of diffusion of the subject molecules through the pores of the matrix.

2. The rate of diffusion of the subject molecules through the windows of the is zeolite.

3. The rate of reaction of the subject molecules on the reactive interior surface of the zeolite.

The slowest rate in a reaction sequence of this kind is usually referred to as the "rate-controlling step". Applicants' experimental work repeatedly showed that the rate of diffusion through the windows of the zeolite particles embedded in the matrix is in fact the rate-controlling step in the zeolite/clay/phosphate catalyst systems of this patent disclosure. Applicants found that even a very small change in the size, or in the number, of windows in a given zeolite, can have a very profound effect on the observed rates of reaction produced by such catalysts—and that the manufacturing processes of this patent disclosure can produce these changes.

Applicants also repeatedly found—quite to their surprise—that the changes in the reaction rates they observed for their alkaline phosphate activated clay/zeolite catalysts (relative to catalysts comprised of zeolite/clay mixtures) were so large in magnitude that that they could only conclude that new compositions of matter had been formed by these preparative methods. Applicants' experimental program also clearly established that the chemical reactions occurring under the reaction conditions of this patent disclosure must be different in kind and/or degree from those reactions that occur in various prior art zeolite/clay phosphate systems, such as those described in the '902 and '739 patents, wherein the same starting materials are employed. Again, two, three and four fold increases in reactivity relative to those achieved by these prior art methods were often obtained.

These differences are of enormous practical significance to the utilization of many different kinds of zeolite catalysts. For example, applicants found that their processes will greatly stabilize such mainstay catalysts as ZSM-5, Y Zeolite and mordenite catalysts. Moreover, the processes of this patent disclosure can be used to stabilize a wide variety of zeolites that, heretofore, have not been used because they are too "unstable" for large scale commercial applications. Thus, in effect, applicants' processes serve to produce several new classes of commercially viable bulk type zeolite catalysts, as well as zeolite additives, through use of a host of zeolite materials that were formerly regarded as being unsuitable by reason of their unacceptable stabilization attributes.

FURTHER EXPERIMENTAL DATA RE: ZEOLITE ACTIVITY

A. Zeolite Studies

Another experimental methodology used by applicants to establish the efficacy of the hereindescribed processes involved steam deactivation of various "pure" zeolites. In such tests, a steam deactivated zeolite sample and a counterpart unsteamed sample were each subjected to comparable microactivity tests. The fresh or unsteamed zeolite was then incorporated into applicants' clay-phosphate matrix (e.g., one commonly used preparation had 12% by weight zeolite in the resulting zeolite/clay/phosphate catalyst) The sample was then spray dried, calcined, and then steam deactivated. Thereafter, both the steam deactivated sample and the unsteamed sample were subjected to comparable MAT procedures. Typical comparative data for such a test are shown in Table III.

TABLE III

| | CATALYTIC ACTIVITY | |
|---|---|---|
| | UNSTEAMED | STEAMED |
| PURE ZEOLITE | 665 | 0 |
| 12% WEIGHT ZEOLITE/ Clay/Phosphate Catalyst | 239 | 147 |

This data shows that pure zeolite has a very high initial catalytic activity; but that this activity drops to zero upon steaming. When however the same zeolite was placed in the zeolite/clay/phosphate catalyst system made by the processes of this patent disclosure, there also was a loss in activity, but the zeolite/clay/phosphate catalyst continued to display good stability. This continued stability, even after being steam treated, implies that applicants' catalysts can be used to great advantage in a wide variety of chemical operations calling for the use of zeolite catalysts. This data also further corroborates applicants' conclusion that a heretofore unknown and unappreciated chemical reaction has occurred between the zeolite and the clay-phosphate ingredients.

(1) Effect of Varying % ZSM-5 in a Clay Matrix on Reaction Rates

Applicants' tests also demonstrated that: (1) varying the zeolite to clay-phosphate ratio in such systems has an effect on the activity of these catalysts. For example, various experiments were made by introducing increasing amounts of a zeolite such as ZSM-5 into a comparable clay-phosphate matrix system. These catalysts were made according to the procedures described in Examples 7 to 14 of this patent disclosure and the catalytic effects of using increasing amounts of ZSM-5 in these systems are given in TABLE IV.

TABLE IV

| ZSM-5, % WT. | Delta LPG, % WT. | Reaction Rate |
|---|---|---|
| 1 | 2.6 | 809 |
| 2 | 3.1 | 489 |
| 3 | 3.8 | 394 |
| 5 | 5.0 | 310 |
| 7 | 5.6 | 249 |
| 12 | 7.9 | 205 |
| 15 | 7.7 | 161 |
| 20 | 9.9 | 154 |

These results also suggest that the ZSM-5 zeolite and the clay-phosphate ingredients are undergoing very extensive chemical reactions. This is especially evidenced by the very great increases in Delta LPG activity obtained per unit of ZSM-5 employed. It also should be specifically noted that, if the ZSM-5 and clay-phosphate were not chemically reacting, but merely forming a physical mixture (that is to say if there were no chemical reactions between these ingredients), then the activity per unit of zeolite would be a constant. In point of fact, there was no indication of an asymptote being formed at some low level of zeolite content. It also should be noted that the "per unit" activity was actually higher than that of a "pure" (i.e., uncombined with the clay) unsteamed zeolite.

(2) Effect of Temperature on Reaction Rates

Another useful criteria for determining if a chemical reaction was occurring in applicants' zeolite-clay-phosphate system was to determine if temperature had an effect on some measurable attribute of the postulated reaction. To study this hypothesis, applicants conducted a series of experiments on systems such as that described in Example 15 wherein the ingredients were mixed at room temperature, aged and spray dried. An identical batch of ingredients was mixed, heated to 85° C., aged for an identical period and then sprayed dried. The results obtained for a catalytic activity test for these materials were as follows:

| Temperature, ° C. | Reaction Rate |
|---|---|
| 20 | 255 |
| 85 | 300 |

This data shows that the use of increased temperatures in preparing these zeolite/clay/phosphate catalysts will produce somewhat improved reaction rates in the subject catalyst. Applicants, however, also established that, generally speaking, temperatures greater than about 95° C. and aging periods less than 0.5 hour do not serve to appreciably increase the reactivities of the resulting catalysts.

(3) Effects of Aging a ZSM-5 Clay-Phosphate Slurry

As previously noted, applicants first became aware of the effect of aging these materials by noting the catalytic effects of drying various slurry samples overnight. The data in the following table show the effect of aging a given ZSM-5-clay-phosphate slurry for various time periods. This particular zeolite/clay/phosphate catalyst contained 12 weight percent ZSM-5 zeolite. These materials were prepared according to the procedures described in Example 3 of this patent disclosure. The results of these tests are shown in TABLE V.

TABLE V

| Aging Time, hours | delta LPG, % Wt. |
|---|---|
| 0 | 4.1 |
| 0.5 | 4.5 |
| 1.0 | 6.5 |
| 2.0 | 6.0 |
| 4.0 | 5.7 |
| 24.0 | 6.7 |

This data also generally demonstrates that most of the gain in catalytic activity of the hereindescribed catalysts occurs in about the first one-half to four hours of the age-reaction; changes in activity for longer age-reaction times appear to be only marginally improved. That is to say that the aging periods for carrying out the hereindescribed processes can be longer than four hours—and produce, for example, somewhat better Delta LPG percent weight data—but in most cases, at least 50% (and often as much as 90%) of the increase in LPG production will be achieved by materials aged for about one to about four hours. For example, TABLE V indicates an average delta LPG of 6.5 for a sample age-reacted for one hour and only a 6.7 delta LPG when that same catalyst was aged for 24 hours. Thus of the 2.6 (6.7−4.1) Δ LPG obtained, 1.6 (5.7−4.1) of it (i.e., 61.5% of the overall gain) was obtained in the first four hours of the age-reaction process.

Applicants also performed experimental studies to elucidate the mechanism of the gain in catalyst activity after aging. In these experiments the clay/phosphate mixture was pre-aged for various times before adding the zeolite. As soon as the zeolite was added the mixture was spray dried. The procedure for preparing these catalyst is shown in Example 4. The activity of the resulting catalysts are summarized in Table VI.

TABLE VI

| Aging Time, Hours | Delta LPG, % wt. |
|---|---|
| 0 | 4.1 |
| 0.5 | 4.9 |
| 1.0 | 5.5 |
| 2.0 | 6.1 |
| 4.0 | 6.6 |
| 24.0 | 6.1 |

These data demonstrate that the critical step is age-reacting the clay with the phosphate; once this has occurred, the interaction between the age-reacted clay and the zeolite apparently occurs very rapidly. That is to say that the rate controlling step is the activation of the clay at a high pH. The data given in Table VI also demonstrate the improvement obtained by use of the age-reactions of this invention because the activity of a sample of material having zero aging, that is to say the material produced by spray drying the slurry immediately after its formulation, is typical of the results obtained using the procedures taught in the '902 and '739 patents. Consequently, the data given in Tables V and VI serve to demonstrate the magnitude of the improvements obtained by the hereindescribed catalysts relative to those obtained by the procedures associated with the above patent references. By way of further example, in Table VI the Delta LPG, % wt. value was 4.1 for the material produced using zero aging time (a la the processes of the '902 and '729 patents) and 5.5 when the material was age-reacted for 1 hour. This 1.4 difference (5.5−4.1) represents a 34 percent (5.5−4.1=1.4÷4.1) improvement when the material is age-reacted for one hour. A 60 percent improvement (6.6−4.1=2.5÷4.1) was obtained when the material was age-reacted for 4 hours.

4. Effects of Other Types of Matrix Components

Applicants also studied the effects of the presence of other types of matrix components on the activity of various zeolites (but especially ZSM-5) to determine if the effects observed are unique to applicants' clay-phosphate components. The two most common hydrocarbon cracking catalyst matrix ingredients tested were silica, and alumina/silica, in the form of colloidal silica/alumina sol. The additives prepared for the hereindescribed experiments contained about 40% by weight ZSM-5, about 45% by weight kaolin clay, with the balance being silica and/or alumina. The silica matrix was made according to Example 16, the alumina/silica matrix was prepared according to Example 15. The data produced by these experiments were as follows:

TABLE VII

| Matrix | Activity |
|---|---|
| Silica | 35 |
| Alumina/Silica | 36 |

The same zeolite employed in these systems, when used in clay-phosphate matrices, gave an activity of about 150. Such experiments also served to show that the improvements in activity of various zeolites is peculiar to their association with the clay-phosphate matrix materials produced by the preparative methods of this patent disclosure.

B. Beta Zeolite Studies

Applicants established that the general processes of this patent disclosure are applicable not only to ZSM-5 but to other zeolites as well. Those skilled in this art will appreciate that ZSM-5 is a member of a family of medium pore size zeolites that have, as one of their most distinguishing features, a port opening of about 5.4Å—and that this port opening size limits the reactants that can be catalyzed by ZSM-5 to molecules of this approximate size—e.g., n-paraffins and n-olefins. There is, however, another broad family of zeolites commonly referred to as "beta zeolite," that have larger openings. For example, not only does beta zeolite have a class of port openings sized at about 5.4Å (a port size similar to that of ZSM-5), it also has a second class of port size openings. This second class of port openings have diameters of about 7.6Å. Consequently, reactions involving larger molecules can be carried out by beta zeolites using both their 5.4Å first openings and their 7.6 Å second openings.

Applicants' further experimental work with beta zeolite also indicated that it behaved—from both a cracking activity point of view and a zeolite stability point of view—in much the same way as a ZSM-5 catalyst with respect to steaming. That is to say that a pure beta zeolite has some activity, but steaming totally destroys this activity. Applicants' data showing this effect were as follows:

| Activity of Beta Zeolite | |
|---|---|
| Unsteamed | Steamed |
| 49 | 0 |

When, however, the very same beta zeolite was incorporated into the clay-phosphate matrixes of this patent disclosure, there was a very dramatic increase in the activity of the beta zeolite catalyst. For example, after steaming, the activity of the beta zeolite noted in the above table increased from 0 for the pure beta zeolite to 132 for a beta zeolite/clay/phosphate catalyst made according to the teachings of this patent disclosure.

C. Studies of Systems Containing Both Beta and Pentasil Type Zeolites (e.g., ZSM-5)

Because of the very pronounced catalytic effects observed with respect to specific zeolite types in the zeolite/clay/phosphate systems, applicants investigated the possibility that various combinations of at least two different types of zeolites would produce useful catalysts. The very surprising result of these experiments was that some multi-component zeolite systems not only showed that the activity of each zeolite in the multi-zeolite system was enhanced by its reaction with the base-activated clay, but the use of multiple zeolites could in some instances even produce very strong synergistic effects. That is to say that, in addition to providing resistance to deactivation of each of the zeolites, the alkaline phosphate-activated clay component promoted strong synergistic effects with respect to the activity of the zeolites by reacting each of the two zeolite components with the alkaline phosphate-activated clay.

In order to better establish that this experimental observation was a unique property of the alkaline phosphate-activated clay matrix, applicants performed an extensive study of several multiple zeolite systems. The results of these studies generally showed that no prior art matrix material (e.g., alumina, silica, silica/alumina, etc.) gave a multi-zeolite system the synergistic effect observed when such multi-zeolite systems were placed in alkaline phosphate-activated clay matrices produced by the processes of this patent disclosure. This is a surprising result and one that has considerable commercial value.

This synergistic effect also was validated in several other ways. For example, the catalytic results (e.g., ΔLPG, gasoline make) produced by catalysts made by the methods described in examples 17 to 22 and having the ZSM-5 and beta zeolite percentages noted in Table VIII were as follows:

TABLE VIII

| ZSM-5, % Wt. | Beta, % Wt. | Delta LPG, % Wt. | Gasoline, % Wt. |
|---|---|---|---|
| 12 | 0 | 6.9 | 45.0 |
| 8 | 4 | 7.9 | 46.4 |
| 6 | 6 | 8.2 | 48.2 |
| 4 | 8 | 7.1 | 48.1 |
| 0.75 | 11.25 | 4.0 | 50.5 |
| 0 | 12 | 2.0 | 51.8 |

These data also are plotted in FIG. 1 wherein variation in Delta LPG production is shown as a function of the amount of beta zeolite in a ZSM-5/beta zeolite/clay/phosphate system made according to the teachings of this patent disclosure. In FIG. 1, the Delta LPG yields of each of the pure zeolites is connected with a straight line. The rationale for doing this is that if these two zeolites (ZSM-5 and beta zeolite) were behaving as a simple mixture, the Delta LPG yields would lie on this line. FIG. 1, however, shows that all of the yields, in fact, lie above this line. Data such as this indicated that there often are positive synergistic effects produced by the conjunctive use of multiple zeolite species (e.g., beta zeolite and ZSM-5) in the overall zeolite-clay-phosphate systems of this patent disclosure.

Those skilled in this art also will appreciate that—when a ZSM-5 is employed as a cracking catalyst in most prior art ZSM-5/clay catalyst systems, an increase in yield of LPG (the delta LPG yield) is usually accompanied by a decrease in the yield of naphtha. That is to say that the ZSM-5 component in such prior art systems serves to form LPG by cracking n-paraffins and n-olefins from the naphtha. Hence, as the yield of LPG goes up the yield of naphtha goes down. This was not, however, the case using certain zeolite-containing catalysts made according to the teachings of this patent disclosure.

For example, applicants assumed that with their beta zeolite/clay/phosphate catalyst, the delta LPG would be about 7.9 weight percent and the naphtha yield would be about 45% weight percent. Applicants also assumed that if the beta zeolite/clay/phosphate catalyst is producing 8.2 weight percent LPG, they would obtain a naphtha yield of about 44.7 weight percent. That is to say that applicants assumed that the 0.3 percent (8.2–7.9) difference would be subtracted from 45 percent to give a total of 44.7 percent naphtha yield. Instead, applicants, to their considerable surprise, found the naphtha yield produced by this catalyst system was 48.2 weight percent. In catalytic cracking yield terms, this represents an enormous difference. It also indicates very clearly that because of its larger port opening the beta zeolite is cracking large quantities of the higher molecular weight hydrocarbons to naphtha (and to LPG). This is therefore an instance where a catalyst that has not been widely used because of its relatively poor stability can be converted into a catalyst that has very good stability through use of the processes of this patent disclosure.

Additional Catalytic Activity Tests

Applicants' catalysts also were evaluated by a MAT procedure wherein they were first steam deactivated. A "standard" catalyst was prepared by flowing a mixture consisting of 90% volume steam and 10% volume air through a bed of a standard catalyst that was maintained at 1450° F. (760° C.) for five hours. The standard catalyst was then run through a microactivity test at the following nominal conditions:

| Temperature | 960° F. (515 C.) |
|---|---|
| WHSV, GMS. OIL/HR., GM CAT | 10.0 |
| TIME, SEC | 80.0 |
| GMS. CATALYST | 4.0 |
| GMS. OF OIL | 0.9 |

A complete set of yields for the standard catalyst was then obtained. These yield tests considered all of the light hydrocarbons from hydrogen up to and including all $C_4$ hydrocarbons. Eight percent by weight of a steam deactivated catalyst was then added to such a standard catalyst and the same MAT was rerun. The activity of the steam deactivated catalyst additive was defined as the increase in the volumetric yield of propylene, butylene and isobutane. Typically, the sum of the yields of these products was 20.6% by volume for the standard catalyst and 28.35% for the standard catalyst with the additive. Frequently it was expedient to alter the zeolite (e.g., ZSM-5) content of an additive, or to use more or less additive in a given test. In such cases, it is desirable to define activity on the basis of 1% by weight ZSM-5. This activity is termed the reaction rate constant (K). In the example given above, if the catalyst contained 12% by weight ZSM-5, and 8% by weight of steam deactivated catalyst was mixed with the standard catalyst, the activity would be 217. This method of measuring activity was used with respect to a very wide variety of samples.

Faujasite Catalysts

These catalysts were evaluated for their catalytic activity by first steam deactivating them. The deactivation procedure employed was to flow 100% by volume steam through a bed of the catalyst maintained at 1400° F. (760° C.) for four hours. The nominal operating conditions on the microactivity test were as follows:

| | |
|---|---|
| Temperature | 960° F. (515 C.) |
| WHSV, GMS. OIL/HR, GM. CAT. | 16.0 |
| TIME, SEC. | 80.0 |
| GMS. CATALYST | 3.0 |
| GMS OF OIL | 1.0 |

The activity of the catalyst was defined as 100 minus the percent volume of a cracked material boiling above 430° F. The presence of this material, often referred to as the "cycle oil", was determined by conventional gas—liquid chromatography procedures.

Preferred Raw Material Sources

The specific clays, catalysts and phosphates that were most widely used in applicants' experimental programs were:

| RAW MATERIALS | | |
|---|---|---|
| TYPE | SOURCE | GRADE OR FORMULA |
| CLAYS | | |
| Kaolin Clay | Thiele | Grade RC-32 |
| Kaolin Clay | Georgia Kaolin | Wrens Clay Slurry |
| Kaolin Clay | Thiele | Grade RC-32-LS Slurry |
| CATALYSTS | | |
| ZSM-5 | AL-Si-Penta | SMSS |
| ZSM-5 | Mobil | Mobil No. 1 |
| ZSM-5 | Mobil | ROF |
| Beta Zeolite | Mobil | Beta |
| REY Zeolite | Conteka | CBV-400 |
| USY Zeolite | PQ | 30-063 |
| Beta Zeolite | Mobile | |
| PHOSPHATES | | |
| Phosphoric Acid | 85% | $H_3PO_4$ |
| Monobasic Ammonium Phosphate | 100% Reagent Grade | $(NH_4)H_2PO_4$ |
| Dibasic Ammonium Phosphate | 100% Reagent Grade | $(NH_4)_2HPO_4$ |
| ALUMINAS | | |
| Alumina | Condea | SB |
| Silica | Dupont | Ludox AS-40 |

ADDITIONAL PREFERRED PROOCEDURES

It also should be noted that some more specific and more preferred procedures for carrying out these processes also may include such further measures as:

(1) creating a kaolinite clay slurry by diluting a kaolinite clay slurry having about a 70% clay concentration to about a 40% concentration by the addition of water to the 70% slurry, (2) bringing the resulting clay-phosphate/water slurry to a pH of from about 7.0 to about 14.0 by introducing a mixture of monobasic ammonium phosphate and dibasic ammonium phosphate into the clay slurry in quantities such that the phosphate component of the slurry is such that the end product will comprise from about 2.0 to about 25.0 weight percent phosphate, (4) placing "optional ingredients" such as hardening agents, viscosity agents, gas evolution agents and/or particle density providing materials in the slurry, (5) vigorously mixing the appropriate reactants, (6) calcining the products of the 1–24 hour aging-reactions, (7) using mixtures of clays to make up the preparation slurries, (8) using mixtures of zeolites to make up the preparation slurries, (9) using one or more fluids (e.g., water and alcohol) in order to form at least a portion of any given clay-phosphate slurry and (10) employing the temperature conditions existing in an operating catalytic cracking unit to supply the heat necessary to dry and/or calcine the herein-described catalysts.

Example 1

In order to study the catalytic capabilities of an "aged" acid phosphate-activated clay, (as opposed to the alkaline phosphate-activated clays of this patent disclosure), 192.2 grams of phosphoric acid was added to 1492.4 grams of a kaolin clay slurry (Theile RC-32-LS) and 857.5 grams of water. Individual samples of the mixture were reacted under agitation at room temperature for 0, 0.5, 1, 2, 4 and 24 hours. Following these reactions, the mixtures were spray dried to form microspheroidal particles. A standard calcination was then performed in a box furnace at 732° C. for a one-hour duration. The results of this study with respect to this system are shown in Table I.

Example 2

By way of contrast with the system described in Example 1, an alkaline system was prepared by adding 558.8 grams of a dibasic ammonium phosphate solution to 1492.4 grams of kaolin clay slurry (Theile RC-32-LS) and 720.9 grams of water. Individual samples of the mixture were aged under agitation at room temperature for 0, 0.5, 1, 2, 4 and 24 hours. Following this aging reaction, the mixtures were spray dried to form microspheroidal particles. A standard calcination was then performed on these particles in a box furnace at 732° C. for a one-hour duration. The results of this experiment are contrasted in Table 1 with the catalytic results for the acid system prepare according to Example 1.

Example 3

In order to study the effects of different age-reaction times on a zeolite/clay/phosphate system, 79.0 grams of ZSM-5 zeolite (Mobil No. 1, 88.4% solids) was slurried under agitation with 720.9 grams of water and 1492.4 grams of kaolin clay slurry (Theile RC-32-LS). To this slurry, 558.8 grams of a dibasic ammonium phosphate solution was added. Individual preparations of the mixtures were aged under agitation at room temperature for 0, 0.5, 1, 2, 4 and 24 hours. Following each respective aging process, the respective mixtures were spray dried to form microspheroidal particles. A standard calcination was then performed on these particles in a box furnace at 732° C. for a one-hour duration.

the manner shown in Table IX. A standard calcination also was performed on the particles from each such formulation. It was carried out in a box furnace at 732° C. for a one-hour duration.

TABLE IX

| EXAMPLE NUMBER | ZEOLITE CONCEN-TRATION (WEIGHT %) | ZSM-5 ZEOLITE SLURRY (39.0% SOLIDS) | SOLIDS OF ZEOLITE SLURRY (WEIGHT %) | WATER | CLAY SLURRY (THEILE RC-32-LS) | DIA-BASIC AMMONIUM PHOSPHATE |
|---|---|---|---|---|---|---|
| 6 | 1 | 25.6 | 39.0 | 739.5 | 1611.0 | 558.8 |
| 7 | 2 | 51.2 | 39.0 | 732.9 | 1592.1 | 558.8 |
| 8 | 3 | 80.4 | 37.2 | 811.5 | 1573.1 | 558.8 |
| 9 | 5 | 134.1 | 37.2 | 795.8 | 1535.2 | 558.8 |
| 10 | 7 | 187.7 | 37.2 | 780.1 | 1497.3 | 558.8 |
| 11 | 12 | 376.1 | 32.0 | 284.6 | 1406.6 | 558.8 |
| 12 | 15 | 384.2 | 39.0 | 646.3 | 1345.7 | 558.8 |
| 13 | 20 | 512.3 | 39.0 | 613.0 | 1250.9 | 558.8 |

Example 4

In order to study the aging reaction effects in systems where the clay-phosphate was pre-age-reacted and subsequently mixed with a zeolite catalyst, 1492.4 grams of kaolin clay slurry (Theile RC-32-LS) was mixed with 720.9 grams of water under agitation. To this slurry was added 558.8 grams of dibasic ammonium phosphate solution. Individual preparations of the resulting mixture were age-reacted under agitation at room temperature for 0, 0.5, 1, 2, 4 and 24 hours. Following this first age-reaction, 79.0 grams of ZSM-5 zeolite (Mobil No. 1, 88.4% solids) was added to each individual preparation. After minimal mixing time to ensure homogeneity, the mixtures were spray dried to form microspheroidal particles. A standard calcination was then performed in a box furnace at 732° C. for a one-hour duration.

Example 5

In order to study the catalytic ability of a typical zeolite catalyst (ZSM-5) in an alumina-based binder, an alumina gel was prepared by adding 499.1 grams of Condea SB Alumina powder to 1845.1 grams of water. Under shear agitating conditions, 74.9 grams of formic acid was then added. This resulted in a dense gel. In a separate container, 596.5 grams of a ZSM-5 zeolite slurry (36.5 w % solids) and 622.0 grams of kaolin clay slurry (Theile RC-32-LS) were mixed. The alumina gel, prepared as noted above, was then added to the mixture under mild agitation. The resulting slurry was then spray dried to form microspheroidal particles. A standard calcination was then performed in a box furnace at 732° C. for a one-hour duration.

Examples 6–13

In order to study the effects of increased ZSM-5 levels in a representative clay-alkaline phosphate binder system, a ZSM-5 zeolite slurry was mixed with water and a kaolin clay slurry (Theile RC-32-LS). Dibasic ammonium phosphate solution was then added. The resulting mixtures were agitated for a period of four hours and then spray dried to form microspheroidal particles. A series of comparable catalytic activity tests were then conducted wherein the relative amounts of the components of such a system were varied in Example 14

Applicants studied the effects of aging reaction temperatures on a ZSM-5/clay/phsophate catalyst made according to the same procedure described in Example 11. After preparing the slurry it was heated to 85° C. with agitation and aged for four hours and then spray dried to form microspheroidal particles. A standard calcination then performed on these particles in a box furnace at 732° C. for a one-hour duration.

Example 15

A ZSM-5/alumina/silica catalyst was prepared by adding 374.4 grams of Condea SB Alumina powder to 1383.9 grams of water. Under shear agitating conditions, 56.2 grams of formic acid was then added; this resulted in a dense gel. In a separate container, 596.5 grams of a ZSM-5 zeolite slurry 36.5 w % solids) was mixed with 127.2 grams of water and 708.5 grams of kaolin clay slurry (Theile RC-32-LS). The alumina gel, prepared as described above, was added to the mixture under mild agitation. This was followed by the addition of 113.4 grams of silica sol (Dupont Ludox Grade XX). The resulting slurry was then spray dried to form microspheroidal particles. A standard calcination was then performed in a box furnace at 732° C. for a one-hour duration.

Example 16

A ZSM-5/silica catalyst was prepared by slurrying 596.5 grams of a ZSM-5 zeolite slurry (36.5 w % solids) with 622.0 grams of kaolin clay slurry (Theile RC-32-LS). To this slurry, applicants added 907.2 grams of silica gel (Dupont Ludox Grade AS-40) under mild agitation. The resulting slurry was spray dried to form microspheroidal particles. A standard calcination was then performed on said particles in a box furnace at 732° C. for a one-hour duration.

Example 17

A 12% beta zeolite system was prepared by mixing 392.0 grams of a beta zeolite slurry (32.6 w % solids) with 765.1 grams water and 1402.6 grams of kaolin clay slurry (Theile RC-32-LS). To this mixture, 558.8 grams of dibasic ammonium phosphate solution were added. The resulting mixture was agitated for a period of four hours and then spray dried to form microspheroidal particles. A standard calcination was then performed on the particles in a box furnace at 732° C. for a one-hour duration.

Example 18

A 11.25% beta zeolite/0.75% ZSM-5 zeolite system was prepared by mixing 20.5 grams of a ZSM-5 zeolite slurry (36.5 w % solids) with 505.4 grams water, 443.7 grams of beta zeolite slurry (25.3 w % solids) and 1406.6 grams of kaolin clay slurry (Theile RC-32-LS). To this mixture, 558.8 grams of dibasic ammonium phosphate solution was added. The resulting mixture was agitated for a period of four hours and then spray dried to form microspheroidal particles. A standard calcination was then performed in a box furnace at 732° C. for a one-hour duration.

Example 19

An 8% ZSM-5 Zeolite/ 4% Beta Zeolite system was prepared by mixing 250.7 grams of a ZSM-5 zeolite slurry (32 w % solids) with 273.2 grams of water, 136.7 grams of a Beta zeolite slurry and 1406.6 grams of kaolin clay slurry (Theile RC-32-LS). To this mixture, 558.8 grams of dibasic ammonium phosphate solution was added. The resulting mixture was agitated for a period of four hours and the resulting material spray dried to form microspheroidal particles. A standard calcination was then performed on the microspheroidal particles in a box furnace at 732° C. for a one-hour duration.

Example 20

A 6% ZSM-5 Zeolite/ 6% Beta Zeolite catalyst was prepared by mixing 188.0 grams of a ZSM-5 zeolite slurry (32 w % solids) with 267.5 grams water, 205.1 grams of a Beta zeolite slurry and 1406.6 grams of kaolin clay slurry (Theile RC-32-LS). To this mixture, 558.8 grams of dibasic ammonium phosphate solution was added. The resulting mixture was agitated for a period of four hours and spray dried to form microspheroidal particles. A standard calcination was then performed in a box furnace at 732° C. for a one-hour duration.

Example 21

A 4t ZSM-5 Zeolite/ 8% Beta Zeolite catalyst was prepared by mixing 125.4 grams of a ZSM-5 zeolite slurry (32 w % solids) with 261.8 grams water, 273.5 grams of a Beta zeolite slurry and 1406.6 grams of kaolin clay slurry (Theile RC-32-LS). To this mixture, 558.8 grams of dibasic ammonium phosphate solution was added. The resulting mixture was agitated for a period of four hours and spray dried to form microspheroidal particles. A standard calcination was then performed on these microspheroidal particles in a box furnace at 732° C. for a one-hour duration.

Example 22

A 12% ZSM-5 zeolite system was prepared by mixing 376.1 grams of a ZSM-5 slurry (32.0 w % solids) with 284.6 grams of water and 1406.6 grams of kaolin clay slurry (Thiele RC-32-LS). To this mixture 558.8 grams of dibasic ammonium phosphate were added. The resulting mixture was agitated for a period of four hours and then spray dried to form microspheroidal particles. A standard calcination was then performed on the particles in a box furnace at 732° C. for a one-hour duration.

Finally, those skilled in the art also will appreciate that while this invention has been generally described in terms of general discussions, specific examples and preferred embodiments, none of these should be taken as a limit upon the scope of the claims of this patent disclosure.

What is claimed is:

1. A process for stabilizing a zeolite catalyst material, said method comprising employing the zeolite catalyst material in the form of a solid, zeolite/clay/phosphate composition that has been made by a process comprising:
    (1) preparing a zeolite-clay-phosphate composition having a pH of from about 7.0 to about 14.0 that is at least in part achieved through the presence of an alkaline phosphate compound in said composition;
    (2) reacting the zeolite-clay-phosphate composition for about 0.5 to about 24 hours to produce an age-reacted zeolite/clay/phosphate composition; and
    (3) drying the age-reacted zeolite/clay/phosphate composition to produce a solid, zeolite/clay/phosphate composition having a zeolite component, a clay component and a phosphate component in quantities such that an end product catalyst made from the zeolite/clay/phosphate composition will be comprised of from about 0.5 to about 40 weight percent zeolite, from about 50 to about 94.5 weight percent clay and from about 5 to about 25 weight percent phosphate.

2. The process of claim 1 wherein the zeolite/clay/phosphate composition is further characterized by its ability to produce at least a 10% increase in a given catalytic activity relative to an analogous catalyst made with the same zeolite-clay-phosphate ingredients, but whose zeolite-clay-phosphate ingredients are reacted for 0.5 to 24 hours.

3. The process for stabilizing a zeolite catalyst material of claim 1 wherein the solid, zeolite/clay/phosphate composition is the form of microspheroidal, particles suitable for circulation in an FCC unit in admixture with at least one other microspheroidal particle species.

4. The process for stabilizing a zeolite catalyst material of claim 1 wherein the solid, zeolite/clay/phosphate composition is in the form of pellets suitable for use in a fixed bed catalyst system.

5. The process for stabilizing a zeolite catalyst material of claim 1 wherein the solid, zeolite/clay/phosphate composition is in the form of pellets suitable for use in a moving bed catalyst system.

6. A process for stabilizing a zeolite catalyst material, said method comprising employing the zeolite catalyst material in the form of a solid, zeolite/clay/phosphate composition that has been made by a process comprising:
    (1) preparing a clay-phosphate composition having a pH of from about 7.0 to about 14.0 that is at least in part achieved through the presence of an alkaline phosphate compound in said composition;
    (2) reacting the clay-phosphate composition for about 0.5 to about 24 hours to produce an age-reacted clay/phosphate composition;
    (3) adding a zeolite to the age-reacted clay/phosphate composition and reacting the resulting zeolite-clay/phosphate composition for from about 0.25 to about 24 hours to produce an age-reacted zeolite/clay/phosphate composition, and
    (4) drying the age-reacted zeolite/clay/phosphate composition to produce a solid, zeolite/clay/phosphate composition having a zeolite component, a clay component and a phosphate component in quantities such that an end product catalyst made from the zeolite/clay/phosphate composition will be comprised of from about 0.5 to about 40 weight percent zeolite, from about 50 to about 94.5 weight percent clay and from about 5 to about 25 weight percent phosphate.

7. The process of claim 6 wherein the zeolite/clay/phosphate composition is further characterized by its ability to produce at least a 10% increase in a given catalytic activity relative to an analogous catalyst made with the same zeolite-clay-phosphate ingredients, but whose clay-phosphate ingredients are not age-reacted for 0.5 to 24 hours and whose zeolite ingredient is not age-reacted for at least 0.25 hours.

8. The process of claim 6 wherein the zeolite-clay-phosphate composition is in the form of a slurry suitable for spray drying.

9. The process of claim 6 wherein the zeolite-clay-phosphate composition is in the form of a paste suitable for extruding.

10. The process of claim 6 wherein the zeolite-clay-phosphate composition is in the form of low moisture powder suitable for dry pressing.

11. The process for stabilizing a zeolite catalyst material of claim 6 wherein the solid, zeolite/clay/phosphate composition is the form of microspheroidal, particles suitable for circulation in an FCC unit in admixture with at least one other microspheroidal particle species.

12. The process for stabilizing a zeolite catalyst material of claim 6 wherein the solid, zeolite/clay/phosphate composition is in the form of pellets suitable for use in a fixed bed catalyst system.

13. The process for stabilizing a zeolite catalyst material of claim 6 wherein the solid, zeolite/clay/phosphate compound is in the form of pellets suitable for use in a fluid bed catalyst system.

14. The process for stabilizing a zeolite catalyst material of claim 6 wherein the solid, zeolite/clay/phosphate compound is in the form of pellets suitable for use in a moving bed catalyst system.

15. A hydrocarbon cracking process for converting a feedstock petroleum-based composition containing compounds of relatively high molecular weights to a product petroleum-based composition containing compounds of relatively lower molecular weights, said process comprising contacting said feedstock petroleum-based composition, at catalytic conditions, with a hydrocarbon altering catalyst comprising a zeolite/clay/phosphate composition comprised of from about 0.5 to about 40 weight percent zeolite, from about 50 to about 94.5 weight percent clay and from about 5 to about 25 weight percent phosphate and wherein the zeolite/clay/phosphate composition is further characterized by its ability to produce at least a 10% increase in a given catalytic activity relative to an analogous catalyst made with the same zeolite-clay-phosphate ingredients but whose clay-phosphate ingredients are not age-reacted for 0.5 to 24 hours and whose zeolite ingredient is not age-reacted for at least 0.25 hours.

16. The process of claim 15 wherein the feedstock petroleum-based composition contains a gas oil and the product petroleum-based composition contains gasoline.

17. A molecular combination reaction process for converting a feedstock petroleum-based composition containing compounds of relatively low molecular weights to a product petroleum-based composition containing compounds of relatively higher molecular weights, said process comprising contacting said feedstock petroleum-based composition, at catalytic conditions, with a hydrocarbon altering catalyst comprising a zeolite/clay/phosphate compound comprised of from about 0.5 to about 40 weight percent zeolite, from about 50 to about 94.5 weight percent clay and from about 5 to about 25 weight percent phosphate and wherein the zeolite/clay phosphate compound is further characterized by its ability to produce at least a 10% increase in a given catalytic activity relative to an analogous catalyst made with the same zeolite-clay-phosphate ingredients, but whose clay-phosphate ingredients are not age-reacted for 0.5 to 24 hours and whose zeolite ingredients is not age-reacted for at least 0.25 hours.

18. The process of claim 17 wherein the feedstock petroleum-based composition contains $C_3$ and $C_4$ olefins as well as isobutane and the product petroleum-based composition contains larger branched hydrocarbons.

* * * * *